United States Patent

[11] 3,612,909

[72] Inventor Hirosuke Imabayashi
Ise, Japan
[21] Appl. No. 44,027
[22] Filed June 8, 1970
[45] Patented Oct. 12, 1971
[73] Assignee Shinko Electric Co., Ltd.
Tokyo, Japan
[32] Priority June 23, 1969
[33] Japan
[31] 44/49778

[54] TRANSISTORIZED SWITCHING CIRCUIT
3 Claims, 5 Drawing Figs.

[52] U.S. Cl. .... 307/282, 307/254, 331/112, 307/315, 3/282
[51] Int. Cl. .... Ho3K 3/282
[50] Field of Search .... 307/282, 315, 254; 331/112

[56] References Cited
UNITED STATES PATENTS

| | | | |
|---|---|---|---|
| 2,994,788 | 8/1961 | Clark | 307/282 |
| 3,161,836 | 12/1964 | Miller | 307/315 |
| 3,237,128 | 2/1966 | Photiades | 307/282 |

*Primary Examiner*—Donald D. Forrer
*Assistant Examiner*—Harold A. Dixon
*Attorney*—Kurt Kelman

ABSTRACT: A transistorized circuit for providing switching action includes main switching transistors and prestage transistors. The circuit also includes a multiwinding current transformer, the primary windings of which are connected in the main switching circuit so that the secondary outputs of the current transformer may be used to obtain driving sources for the prestage transistors. In a preferred embodiment, driving currents sufficient to cause the main switching transistors to full-saturate are always supplied to the prestage transistors by back-to-back diode circuits.

INVENTOR
HIROSUKE IMABAYASHI
BY Kurt Kelman
AGENT

INVENTOR
HIROSUKE IMABAYASHI
BY Kurt Kelman
AGENT

TRANSISTORIZED SWITCHING CIRCUIT

BACKGROUND OF THE INVENTION

This invention relates to a transistorized switching circuit and more particularly to a transistorized switching circuit having switching transistors and prestage transistors connected thereto wherein the switching transistors provide switching action by the application of control signals to the bases of the prestage transistors.

Generally speaking, where transistors are utilized as switching elements, it is possible to switch a large current on and off by means of a very small control signal, for example by using the Darlington connection, provided additional transistors are provided in a stage preceding the main switching transistors. However, transistors connected in the above manner require a large amount of power and it is impossible to operate them efficiently, so that in the prior art, it has been necessary to provide driving sources for exclusive use by the prestage transistors so as to eliminate said disadvantage.

However, the prestage transistors of such prior art circuits are driven by driving sources whose output does not change in response to changes in the main circuit current; the disadvantage of this being a greater power loss during normal operation when the main circuit current varies greatly or when the circuit is utilized as a switching element for an inverter to drive an electric motor.

Therefore, it is an object of the present invention to provide a transistor circuit for providing switching action which obviates the foregoing disadvantages of the prior art.

It is another object of the present invention to provide a transistor circuit characterized by reduced power consumption, high efficiency and reliable switching action.

It is a further object of the present invention to provide a transistor circuit in which the power loss is low even though it is subjected to an overload or heavy load.

SUMMARY OF THE INVENTION

The basic feature of this invention resides in a transistorized switching circuit which provides switching action characterized in that the primary windings of a current transformer are connected in the main switching circuit, the secondary outputs the current transformer being utilized to provide driving sources for the prestage transistors. The preferred embodiment resides in a transistor circuit based on the above circuit which is characterized in that driving currents sufficient to cause the main circuit transistors to full-saturate are always supplied to the prestage transistors by back-to-back diode circuits.

DESCRIPTION OF THE PREFERRED EMBODIMENTS

Figure 1:
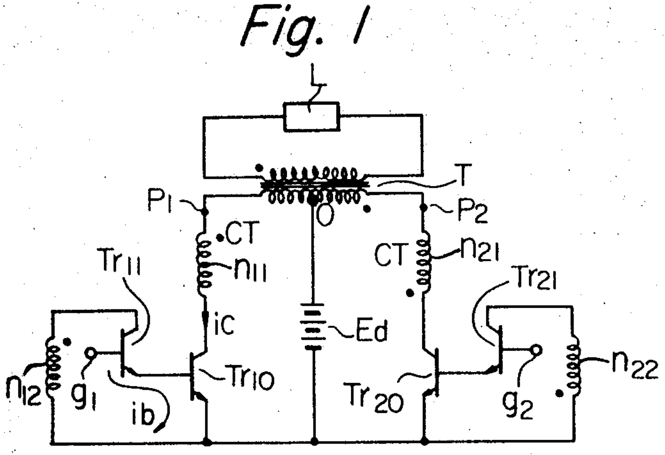
FIG. 1 is a schematic diagram of an embodiment of a transistor circuit according to the present invention.

FIG. 1 shows a DC power source E$d$, a power transformer T, a current transformer CT having two primary windings and two secondary windings, and a pair of switching transistors $Tr_{10}$ and $Tr_{20}$. The collector of the transistor $Tr_{10}$ is connected through a primary winding $n_{11}$ of the current transformer CT to one terminal $P_1$ of the transformer T. The emitter of transistor $Tr_{10}$ is connected through the DC power source E$d$ to the center top O of the transformer T. The collector of the transistor $Tr_{20}$ is connected through a primary winding $n_{21}$ of the current transformer CT to the other terminal $P_2$ of the transformer T. The emitter of transistor $Tr_{20}$ is connected through the DC power source E$d$ to terminal 0 of the transformer T.

In this drawing there are also shown transistors $Tr_{11}$ and $Tr_{21}$. The collector transistor $Tr_{11}$ is connected through a secondary winding $n_{12}$ of the current transformer CT to the emitter of the transistor $Tr_{10}$. The collector of the transistor $Tr_{21}$ is connected through a secondary winding $n_{22}$ of the current transformer CT to the emitter of the transistor $Tr_{20}$. L designates a load for example an electric motor or the like, and is connected to the secondary of the power transformer T. In addition, the conventional dot notation is used to represent the polarity of each winding of the transformer T and the current transformer CT.

In the foregoing circuit configuration, if the transistors $Tr_{10}$ and $Tr_{20}$ are energized in such a manner as to provide switching action, for example by causing them to conduct for a certain time interval, alternately by applying an input, alternately, to the bases of prestage transistors $Tr_{11}$ and $Tr_{21}$, at terminals $g_1$ and $g_2$, which, provide an amplifying action, an alternating voltage will be induced in the secondary of the transformer T.

For example, if the transistor $Tr_{10}$ becomes conductive, a current $i_c$, corresponding to a load current $i_L$ (see FIG. 5), flows in the primary winding $n_{11}$ of the current transformer CT and through the transistor $Tr_{10}$, while in the secondary winding $n_{12}$ of the current transformer CT, a current $i_b$ is induced in a direction to counterbalance the effect of the ampere turns in the primary winding of the current transformer; this induced current $i_b$ flows through the collector-emitter path of transistor $Tr_{11}$ and the base-emitter path of the main transistor $Tr_{10}$. If the turns ratio of the primary and secondary windings of the current transformer CT is taken to be $K_1$, the foregoing induced current $i_b$ becomes $K_1$ times the main circuit current $i_c$, (that is $i_b=K_1 i_c$) in magnitude. Therefore, if this turns ratio $K_1$ is made larger than the value of $1/\beta_1$, where $\beta_1$ the current amplification factor of the main circuit transistor $Tr_{10}$, the following relationship is valid:

$$i_c<\beta_1 i_b \qquad (1)$$

Thus, the main transistor $Tr_{10}$ can assume the fully saturated conductive state required for proper switching action. Similarly, if the value of the turns ratio $K_2$ for the primary and secondary windings $n_{21}$ and $n_{22}$ of the current transformer CT is selected so as to be larger than $1/\beta_2$, where $B_2$ is the current amplification factor of the main transistor $Tr_{20}$, when an input is supplied to the base of transistor $Tr_{21}$, the main transistor $Tr_{20}$ instantly assumes the fully saturated conductive state. Therefore, according to the present invention, the transistors will provide switching action with high efficiency and with little power loss. In addition, since the induced current of the current transformer which induced current serves as a driving source for transistors, $Tr_{11}$ and $Tr_{12}$ increases and decreases in response to an increase and decrease in the main circuit current, in the present invention, it is, in contrast to the prior art, unnecessary to construct the circuit so that a current always flows which corresponds to the maximum load current. Thus, it is possible to reduce power loss substantially in comparison to prior art circuits.

However, in the circuit shown in FIG. 1, since the driving current $i_b$ for transistors $Tr_{11}$ and $Tr_{12}$ is not present unless the main current $i_c$ flows, it is necessary to apply a differentiated input, in synchronism with the input to the bases of transistors $Tr_{11}$ and $Tr_{12}$ to the base of the main transistors $Tr_{10}$ and $Tr_{20}$ at the beginning of the conducting cycle of each transistor. Thus, additional complex circuitry must be provided and various other problems result.

Figure 2:
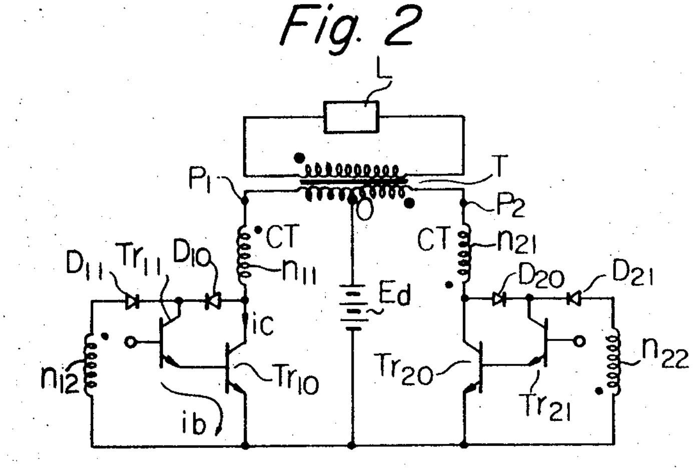
FIG. 2 is a schematic diagram of another embodiment according to the present invention.

Another embodiment, shown in FIG. 2, overcomes the foregoing disadvantage, and differs from the embodiment shown in FIG. 1 in that a pair of diodes $D_{10}$ and $D_{11}$ are connected, respectively, between the collector of the transistor $Tr_{11}$ and the collector of transistor $Tr_{10}$ and between the collector of the transistor $Tr_{11}$ and the secondary winding $n_{12}$ of the current transformer CT, with polarities as shown. Diodes $D_{20}$ and $D_{21}$ are similarly connected, between the collector of the transistor $Tr_{21}$ and the collector of transistor $Tr_{20}$ and between the collector of transistor $Tr_{21}$ and the secondary winding $n_{22}$ of the current transformer CT, with polarities as shown.

With this construction, if the normal input signal is applied to the base of transistor $Tr_{11}$, with the main current $i_c$ absent, a current will flow from the collector of the main transistor $Tr_{10}$, through the diode $D_{10}$ and transistor $Tr_{11}$, to the base of the transistor $Tr_{10}$ causing transistor $Tr_{10}$ to become conductive. After transistor $Tr_{10}$ becomes conductive, the driving current $i_b$ corresponding to the main current, is supplied through the secondary winding $n_{12}$ of the current transformer CT to transistor $Tr_{11}$ and, the same time, the diode $D_{10}$ will be reverse biased, so that the current $i_b$ will be dissipated.

Figure 3:
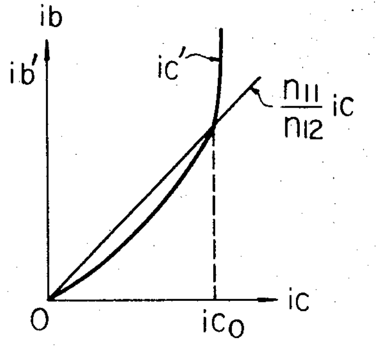
FIG. 3 is a diagram showing a current characteristic in the embodiment of FIG. 1.

Further, in order to drive the main transistor $Tr_{10}$ into the fully saturated conductive state, even when the main current $i_c$ is very large, it is necessary, as shown in FIG. 3, to provide a base current $i_b'$, larger than the induced current $i_b$ in the secondary of the current transformer CT. However, in this embodiment diode $D_{10}$ is present, so that when the collector-emitter voltage $V_{CE}$ of transistor $Tr_{10}$ begins to increase, in response to the main current $i_c$ becoming larger than the current value $i_{co}$ shown in FIG. 3, the voltage developed across the diode $D_{10}$ takes a direction to reverse the bias the same; thus, the base current needed to cause transistor $Tr_{10}$ to become full-saturated is supplied through the diode $D_{10}$ and transistor $Tr_{11}$. The result of this is that an excessive rise in the voltage $V_{CE}$ between the collector and the emitter of transistor $Tr_{10}$ can be suppressed, so that when the circuit is subjected to transitional overload or heavy loads of short duration, the power loss in the transistors is much less than in prior art circuits, or in the embodiment shown in FIG. 1.

Figure 4:
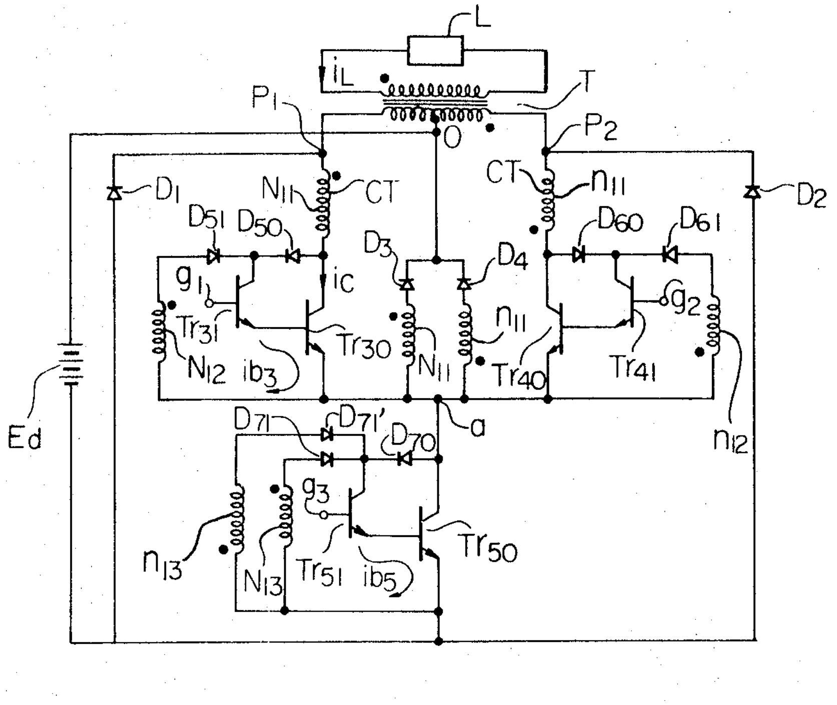
FIG. 4 is a schematic diagram of a further embodiment according to the present invention.

FIG. 4 shows a further embodiment of the present invention, comprising switching transistors $Tr_{30}$, $Tr_{40}$ and $Tr_{50}$, amplifying transistors $Tr_{31}$, $Tr_{41}$ and $Tr_{51}$ connected in front of the switching transistors $Tr_{30}$, $Tr_{40}$ and $Tr_{50}$, a transformer T, a current transformer CT, a load L, a DC power source E*d*, and diodes $D_1, D_2, \ldots, D_{71}, D_{71}'$.

The collectors of transistors $Tr_{30}$ and $Tr_{40}$ are connected, respectively, through primary windings $N_{11}$ and $n_{11}$ of the current transformer CT to terminals $P_1$ and $P_2$ of the transformer T, and the emitters of transistors $Tr_{30}$ and $Tr_{40}$ are connected to a common junction point *a*. The collector of the transistor $Tr_{40}$ is connected to the junction point *a* and its emitter is connected, through the DC power source E*d*, to the center tap terminal O of the primary winding of transformer T.

The diodes $D_1$ and $D_2$ are connected between the emitter of the transistor $Tr_{50}$ and the corresponding terminals $P_1$ and $P_2$ of the transformer T, with polarities as shown, and form a closed loop for the flow of a current of an opposite polarity to the load current through the transformer primary, in the event the load power-factor becomes leading or lagging, so that a time interval occurs during which the polarity of the load current is opposite to that of the output voltage. The diodes $D_3$ and $D_4$ are connected between terminal O of the transformer T and the common junction point *a* through, respectively, additional secondary windings $N_{11}'$ and $n_{11}'$ of the current transformer, with polarities as shown, to form a closed loop through transistors $Tr_{30}$ and $Tr_{40}$ for the flow of a current which corresponding to a lagging load current through the primary side of the transformer T, while a transistor $Tr_{50}$ is provided for controlling the conducting interval (which is controlled through a terminal $g_3$ during each half-cycle) is nonconductive, for example, in the event the load has a lagging power-factor. The diodes $D_{50}$ and $D_{51}$, $D_{60}$ and $D_{61}$, and $D_{70}$, $D_{71}$ and $D_{71}'$ form back-to-back diode circuits, the operation of which was explained with reference to the embodiment of FIG. 2.

As explained above, the current transformer CT has primary windings $N_{11}$, $n_{11}$, $N_{11}'$ and $n_{11}'$. The outputs derived through the secondary windings $N_{12}$ and $N_{13}$ of transformer CT are utilized as driving sources for the transistors $Tr_{31}$ and $Tr_{51}$, and the other outputs which are derived through the secondary windings $n_{12}$ and $n_{13}$, are used as driving sources for the transistors $Tr_{41}$ and $Tr_{51}$. In this embodiment, the turns ratio of the respective windings are selected so that $N_{12}=N_{13}$, $N_{11}'=N_{11}/2$, $n_{12}=n_{13}$, and $n_{11}'=n_{11}/2$. Further, the conventional dot notation is used to represent the polarity of each winding of the transformer T and the current transformer CT.

Figure 5:
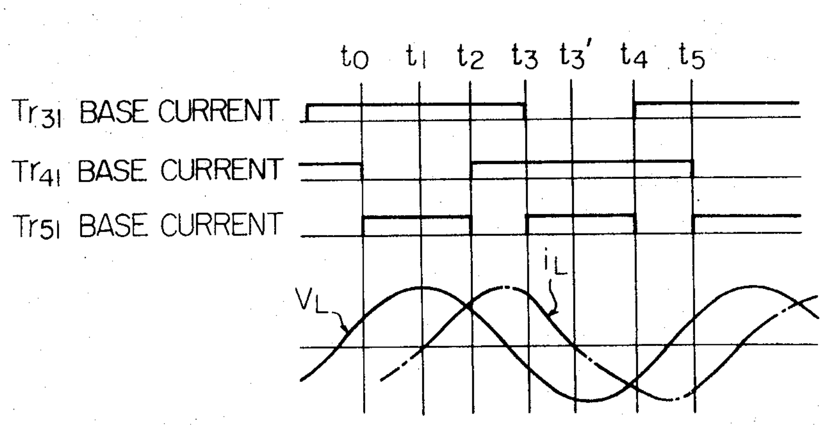
FIG. 5 is a timing diagram relating to the further embodiment shown in FIG. 4.

In the foregoing arrangement, if the respective switching transistors $Tr_{30}$, $Tr_{40}$ and $Tr_{50}$ are rendered conductive in accordance with the timing diagram shown in FIG. 5, during time interval $t1-t2$ the following relationship is valid between the main current $i_c$ and respective transistor driving currents $i_{b3}$ and $i_{b5}$:

$$N_{11}i_c=N_{12}i_{b3}+N_{13}ib_5 \quad (2)$$

and, if it is assumed that the load impedances of windings $N_{12}$ and $N_{13}$ are identical and that the numbers of turns in windings $N_{12}$ and $N_{13}$ are the same, the following relationship is valid:

$$i_{b3}=i_{b5}=(N_{11}/2N_{12})i_c=(N_{11}/2N_{13})i_c \quad (3)$$

Therefore, if the relationships between the winding ratios of $N_{11}$, $N_{12}$ and $N_{13}$, and the current amplification factors $\beta_3$, $\beta_5$ of transistors $Tr_{30}$ and $Tr_{50}$ are selected in a manner similar to that explained with reference to FIG. 1, the following relationship can be obtained:

$$i_c<\beta_3 i_{b3}=\beta_5 i_{b5} \quad (4)$$

Thus, it is possible to turn transistors $Tr_{30}$ and $Tr_{50}$ into a fully saturated state.

Next, during time interval $t2-t3$, the transistor $Tr_{40}$ becomes nonconductive, so that in the event the load has, for example, a lagging power-factor, a current corresponding to a lagging load current $i_L$ flows through the winding $N_{11}$ and the diode $D_3$. In this case, the magnetomotive forces established by the windings $N_{11}$ and $N_{11}'$ counterbalance each other. However, the two windings have the mutual relationship $N_{11}=2N_{11}'$, so the following equation is derived:

$$i_{b3}=(N_{11}/2N_{12})i_c, c<\beta_3 i_{b3} \quad (5)$$

Accordingly, the transistor $Tr_{30}$ becomes fully saturated. If winding $N_{11}'$ is not connected, the value of the driving current $i_{b3}$ becomes twice as large [$i_{b3}=(N_{11}/N_{12})i_c$]; in this case the power loss increases and further, the switching speed of the transistor $Tr_{30}$ will be slowed down. In the above embodiment, one winding of the current transformer is connected in the commutating diode circuit, and thus prevents such a disadvantage from rising, by the use of the electromotive force generated by that winding.

Further, though there is a chance that a time interval ($to-t1$), during which the polarity of the current may become reversed, may occur, depending upon the property of the load, as explained herein, at this time the main current $i_c$ passing through the diode $D_1$ will not flow through any winding of the current transformer CT, so that during this period the driving current $i_{b3}$ ceases, so no base current is lost.

Similarly, during the period $t4-t5$ the transistors $Tr_{40}$ and $Tr_{50}$ will be in the fully saturated state. Also, during the period $t3-t4$ the diode $D_3$ is reverse biased and the main current flows through the diode $D_4$; thus, the transistor $Tr_{40}$ turns into a fully saturated state.

In summary, the invention resides in a circuit in which prestage transistors are connected to the bases of the main circuit transistors and, by application of a very small control input to the bases of the prestage transistors, the main circuit transistors are caused to provide switching action, the invention being characterized by the fact that the prestage transistors are driven by the outputs of a current transformer connected in the main circuit; therefore, by establishing the foregoing relationship between the winding ratios of the current transformer and the current amplification factors of the main circuit transistors, it is possible to reduce power loss and to provide switching action at high efficiency. Further, since the base current of the main circuit transistors can be modified in response to the main circuit current, a minimally needed driving current always flows and thereby they are driven more efficiently.

While preferred embodiments of the invention have been described hereinabove, it is appreciated that variations and modifications may be made by one skilled in the art without departing from the spirit and scope of the invention.

What is claimed is:

1. In a switching circuit of the type which has at least two main switching transistors and in which prestage transistors are associated with the main transistors so that, by the application of control signals to the bases of said prestage transistors, said main circuit transistors provide switching action, the improvement which comprises a current transformer connected in the main circuit, the outputs of said current transformer said at least two primary windings across the primary winding of said power transformer;

at least two prestage transistors, each connected in series with one of said secondary windings of the current transformer and with a diode between the common junction point of said two switching transistors and the base electrode of the corresponding switching transistor, said prestage transistors being driven alternately by an input applied to their base electrodes, and two diodes, each connected between the junction between the primary winding of the power transformer and the corresponding switching transistor and the junction